United States Patent
Li et al.

(10) Patent No.: US 12,240,419 B2
(45) Date of Patent: Mar. 4, 2025

(54) AUTONOMOUS DRIVING CAMERA CLEANING SYSTEM

(71) Applicant: TUSIMPLE, INC., San Diego, CA (US)

(72) Inventors: Qiwei Li, Tucson, AZ (US); Todd B. Skinner, San Diego, CA (US)

(73) Assignee: TUSIMPLE, INC., San Diego, CA (US)

( * ) Notice: Subject to any disclaimer, the term of this patent is extended or adjusted under 35 U.S.C. 154(b) by 219 days.

(21) Appl. No.: 17/363,887

(22) Filed: Jun. 30, 2021

(65) Prior Publication Data
US 2021/0402962 A1 Dec. 30, 2021

Related U.S. Application Data

(60) Provisional application No. 63/046,368, filed on Jun. 30, 2020.

(51) Int. Cl.
*B60S 1/56* (2006.01)
*B08B 1/16* (2024.01)
(Continued)

(52) U.S. Cl.
CPC ............... *B60S 1/56* (2013.01); *B08B 1/165* (2024.01); *B08B 1/30* (2024.01); *B08B 3/02* (2013.01);
(Continued)

(58) Field of Classification Search
CPC .... B60S 1/56; B60S 1/06; B60S 1/483; B60S 1/52; B60S 1/542; B60S 1/10;
(Continued)

(56) References Cited

U.S. PATENT DOCUMENTS

| | | | | |
|---|---|---|---|---|
| 6,607,606 B2 * | 8/2003 | Bronson | ............ | G02B 27/0006 134/44 |
| 10,442,402 B2 * | 10/2019 | Schmidt | ................... | B60S 1/52 |

(Continued)

FOREIGN PATENT DOCUMENTS

| | | | | |
|---|---|---|---|---|
| WO | WO-2015198645 A1 * | 12/2015 | ................ | B60S 1/60 |
| WO | WO-2019187241 A1 * | 10/2019 | ............. | B08B 13/00 |

OTHER PUBLICATIONS

Fukuda D, WO-2015198645-A1, Machine Translation, Abstract. (Year: 2023).*
(Continued)

*Primary Examiner* — Duy Vu N Deo
*Assistant Examiner* — Christopher Remavege
(74) *Attorney, Agent, or Firm* — Perkins Coie LLP

(57) ABSTRACT

A camera cleaning system for an autonomous vehicle may include a platform that can accommodate multiple cameras, wiper systems, as well as a fluid delivery system. The wiper system may include a wiper, rail, and a hydraulic motion component for each camera. The platform surface that contacts the wiper system's wipers and cleaning fluid may be angled and may include a window or lens for each camera. The autonomous vehicle may include a controller that may decide when a camera cleaning protocol should be executed. Alternatively, or additionally, a camera cleaning protocol may be executed periodically, as indicated by a controller.

7 Claims, 13 Drawing Sheets

(51) Int. Cl.

| | | |
|---|---|---|
| *B08B 1/30* | (2024.01) | |
| *B08B 3/02* | (2006.01) | |
| *B08B 13/00* | (2006.01) | |
| *B60S 1/06* | (2006.01) | |
| *B60S 1/48* | (2006.01) | |
| *B60S 1/52* | (2006.01) | |
| *B60S 1/54* | (2006.01) | |
| *G02B 27/00* | (2006.01) | |
| *G05D 1/00* | (2024.01) | |

(52) U.S. Cl.
CPC ............ *B08B 13/00* (2013.01); *B60S 1/06* (2013.01); *B60S 1/483* (2013.01); *B60S 1/52* (2013.01); *B60S 1/542* (2013.01); *G02B 27/0006* (2013.01); *B08B 2203/027* (2013.01); *G05D 1/0231* (2013.01)

(58) Field of Classification Search
CPC ........ B60S 1/3404; B60S 1/481; B60S 1/524; B60S 1/544; B60S 1/603; B08B 1/005; B08B 1/008; B08B 3/02; B08B 13/00; B08B 2203/027; B08B 5/02; G02B 27/0006; G05D 1/0231; G03B 30/00; H04N 23/52
See application file for complete search history.

(56) References Cited

U.S. PATENT DOCUMENTS

| | | | | |
|---|---|---|---|---|
| 10,518,751 | B2* | 12/2019 | Seubert | G06T 5/001 |
| 10,589,726 | B1* | 3/2020 | Ingram | B60S 1/28 |
| 11,305,733 | B2* | 4/2022 | Herrmann | H04N 23/811 |
| 11,661,036 | B2* | 5/2023 | Gilbertson | B60S 1/34 |
| | | | | 15/250.361 |
| 11,667,268 | B2* | 6/2023 | Kawamura | B60S 1/485 |
| | | | | 134/57 R |
| 2002/0005440 | A1* | 1/2002 | Holt | B05B 15/652 |
| | | | | 239/284.2 |
| 2003/0233723 | A1* | 12/2003 | Lizotte | G02B 27/0006 |
| | | | | 15/246 |
| 2011/0073142 | A1* | 3/2011 | Hattori | B60S 1/52 |
| | | | | 134/198 |
| 2013/0092758 | A1* | 4/2013 | Tanaka | B60S 1/52 |
| | | | | 239/284.1 |
| 2014/0009616 | A1* | 1/2014 | Nakamura | H04N 7/18 |
| | | | | 348/148 |
| 2014/0036132 | A1* | 2/2014 | Pawlowski | B60S 1/0411 |
| | | | | 348/335 |
| 2015/0172582 | A1* | 6/2015 | Kiyohara | B60R 11/04 |
| | | | | 348/322 |
| 2015/0203076 | A1* | 7/2015 | Irie | G06T 7/174 |
| | | | | 15/319 |
| 2016/0121855 | A1* | 5/2016 | Doorley | B60S 1/56 |
| | | | | 15/250.01 |
| 2016/0210757 | A1* | 7/2016 | Lavoie | B62D 13/06 |
| 2016/0272165 | A1* | 9/2016 | Hsiao | H04N 23/811 |
| 2018/0009418 | A1* | 1/2018 | Newman | B08B 3/02 |
| 2018/0105146 | A1* | 4/2018 | Lopez | B60S 1/60 |
| 2018/0201231 | A1* | 7/2018 | Tani | B60S 1/56 |
| 2018/0221921 | A1* | 8/2018 | Magee | H01L 41/09 |
| 2018/0244204 | A1* | 8/2018 | Boehm | B60R 1/04 |
| 2019/0009752 | A1* | 1/2019 | Rice | B60S 1/56 |
| 2019/0084526 | A1* | 3/2019 | Seubert | G06T 7/74 |
| 2019/0106085 | A1* | 4/2019 | Bacchus | B60S 1/62 |
| 2019/0322245 | A1* | 10/2019 | Kline | B60S 1/0848 |
| 2020/0108801 | A1* | 4/2020 | Frederick | B60S 1/481 |
| 2020/0174156 | A1* | 6/2020 | Terefe | G01S 17/95 |
| 2020/0238305 | A1* | 7/2020 | Saito | B05B 1/14 |
| 2020/0331435 | A1* | 10/2020 | Dingli | B60R 11/04 |
| 2021/0107040 | A1* | 4/2021 | Violetta | B08B 3/041 |
| 2021/0181502 | A1* | 6/2021 | Li | B08B 13/00 |
| 2021/0188215 | A1* | 6/2021 | Letizio | B60S 1/0848 |
| 2021/0387598 | A1* | 12/2021 | Trebouet | B60S 1/524 |
| 2022/0203936 | A1* | 6/2022 | Torii | B60S 1/54 |

OTHER PUBLICATIONS

Hayashi, WO-2019187241-A1, Machine Translation, Abstract. (Year: 2023).*

* cited by examiner ized herein.
AUTONOMOUS DRIVING CAMERA CLEANING SYSTEM

CROSS-REFERENCE TO RELATED APPLICATIONS

This patent document claims priority to and the benefits of U.S. Provisional Patent Application No. 63/046,368, titled "AUTONOMOUS DRIVING CAMERA CLEANING SYSTEM", filed Jun. 30, 2020. The entire content of the before-mentioned patent application is incorporated by reference as part of the disclosure of this document.

TECHNICAL FIELD

This patent document relates to autonomous vehicles and, in particular, to cameras used on autonomous vehicles.

BACKGROUND

Vehicles can be autonomously controlled to navigate along a path to a destination. Such autonomous vehicles include at least one sensor that gathers information about their surrounding environment. Autonomous vehicles analyze the gathered sensor information to select trajectories that avoid collisions and guide the autonomous vehicle to the desired location. For example, these sensors include cameras and light detection and ranging (LiDAR) sensors that use light pulses to measure distances to various objects surrounding the autonomous vehicles.

SUMMARY

Disclosed are devices, systems, and methods for keeping a camera surface of a camera installed on an autonomous vehicle clean.

An aspect of the disclosed embodiments relates to a method of cleaning a camera that includes determining, by a processor, an occurrence of a condition to clean a camera affixed to an autonomous vehicle. The method also includes actuating, in response to the occurrence of the condition, a camera cleaning system to start a camera cleaning operation. The method further includes determining, at a time after the actuating, in response to occurrence of an end condition, to end the camera cleaning operation.

Another aspect of the disclosed embodiments relates to a camera cleaning system that includes a wiper assembly configured to control movement of a wiper blade on a camera surface. The system also includes a fluid assembly configured to spray a fluid on the camera surface. The system further includes one or more processors configured to control operations of the wiper assembly and the fluid assembly as a function of a quality of images obtained from the camera.

Yet another aspect of the disclosed embodiments relates to a camera cleaning system that includes a wiper assembly configured to control operation of the wiper for cleaning a camera surface. The camera cleaning system further includes a fluid assembly configured to spray a fluid on the camera surface. The camera cleaning system also includes one or more processors configured to control operations of the wiper assembly, the fluid assembly, or both the wiper assembly and the fluid assembly intermittently based on a control signal received from a controller of an autonomous vehicle.

An aspect of the disclosed embodiments relates to a camera cleaning system that includes a housing having a base surface and a front surface, wherein the front surface is fixedly attached to the base surface at an angle. The camera cleaning system also includes one or more openings in the front surface. The camera cleaning system further includes one or more camera cleaning assemblies affixed to the housing, each camera cleaning assembly comprising a wiper blade configured to perform linear back-and-forth movements across a corresponding camera surface, wherein each of the one or more openings comprises one of the corresponding camera surfaces.

The above and other aspects and features of the disclosed technology are described in greater detail in the drawings, the description and the claims.

BRIEF DESCRIPTION OF THE DRAWINGS

The various embodiments according to the technology disclosed in this patent document are illustrated by way of example, and not by way of limitation, in the figures of the accompanying drawings.

Figure 1:
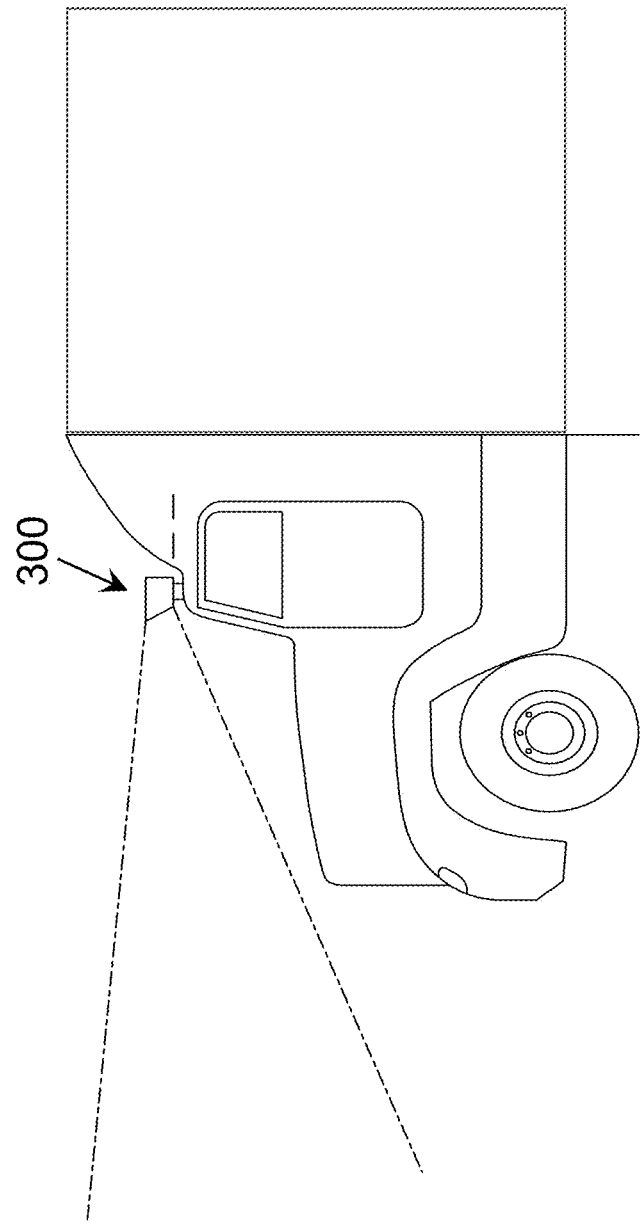
FIG. 1 shows an example of an autonomous vehicle equipped with a camera.

It should be further noted that while, for simplicity of explanation, the same reference numbers have been used to identify some of the elements in different figures, it is understood that this designation does not necessarily mean that those elements are identical. In particular, one or more characteristics of the elements (e.g., material, dimension, etc.) are contemplated to be modified based on the particular configurations and/or desired performance characteristics. It is contemplated that elements disclosed in one embodiment may be beneficially utilized in other embodiments without specific recitation of those elements in the other embodiments.

DETAILED DESCRIPTION

Autonomous vehicles, referred to as "vehicle" or "vehicles" hereafter, may be driven without direct navigational control by a human driver. A vehicle may rely on various sensors to perceive areas surrounding the vehicle. Such vehicles should be able to operate not only in road conditions that are drivable for a human driver but also in road conditions which may be considered unsafe or dangerous for a human driver. Furthermore, such vehicles are expected to drive with little, or no, human maintenance assistance during their operation.

One commercial application of autonomous vehicles may be for transportation of commercial cargo. Autonomous truck fleets will be expected to operate on a continuous basis throughout the year (e.g., every day of the week, every hour of each day), for long driving durations over long distances, and at high speeds on highways. These vehicles may also be expected to operate in severe weather conditions by using advanced computational and sensory perception technologies. However, one operational issue faced by such vehicles may be related to the condition of the sensors and cameras that the vehicle relies on for autonomous navigation.

For example, bugs, dust, snow and/or rain may block or impair view of a camera of an autonomous vehicle. The impairments may in turn result in a failure of the autonomous vehicle to detect obstacles in an area surrounding the vehicle, which then may cause errors or a failure in the autonomous navigation and/or driving. For example, in implementations of the autonomous vehicle navigation and/or control systems that use information gathered from images captured from one or more cameras of the autonomous vehicle to determine navigation and/or control commands, impaired cameras may lead to an overall sub-optimal performance by the vehicle, e.g., the vehicle may drive slowly or erratically. In some cases, impaired visual quality of the images captured by a camera on the vehicle that arises, for example, due to contamination of a surface of a lens (or an objective) of the camera, may result in a vehicle simply ceasing its operation, e.g., due to determining that the quality of the captured images has fallen below a threshold.

The technology disclosed in this patent document allows for its implementations to monitor the quality of images captured by a camera of an autonomous vehicle, determine camera status or condition based on the quality of the captured images and also provide a cleaning system that keeps a field of view of the camera clean via keeping one or more surfaces of the camera optics clean.

As further described in the present document, in some embodiments, an electromechanical cleaning system includes a central controller that controls camera cleaning operations. The system may further include one or more electrical circuits for transmitting, receiving and/or processing various signals described in the present document. The system may also include liquid and/or air circuits, containers, conduits, valves and respective actuators (e.g., pistons), that work together with an autonomous driving system.

As further described in the present document, in some embodiments, mechanisms or parts of a cleaning system according to the disclosed technology may be integrated in a camera enclosure that is affixed to an autonomous vehicle. The mechanisms may be configured to clean a surface of a camera such as an outside surface of a lens of the camera. Alternatively, or in addition, the mechanisms may be configured to clean a window and/or a lens on the camera enclosure that is positioned in front of the camera (e.g., to protect the camera from the outside elements). The cleaning can be performed to make sure that under normal weather conditions and some extreme bad weather, the quality of the camera view (as, e.g., reflected in the quality of the camera images) will always be good enough to guarantee a high perception recognition rate.

In the present document, directional references such as "front," "top" and "bottom" are used by referring to a coordinate system in which one or more cameras will appear to be on top of the driver cab in the vehicle when looking at the vehicle from the front (driving direction) of the vehicle. In such embodiments, when standing in front of the vehicle and looking towards the vehicle, wipers may appear to move sideways (left to right, and/or right to left) during their cleaning motion. However, in different embodiments, the cleaning system described in the present document may be affixed to a side or a top of a camera and wipers may be controlled to sweep top to bottom and/or bottom to top.

FIG. 1 shows an example of an autonomous vehicle 100 with a camera 300 mounted on the front part of the vehicle. The camera 300 is installed on the top front of the truck shown in FIG. 1. However, in general, more than one camera may be used and may be placed at different locations and may be pointing in any direction, e.g., to the front, side or back of the vehicle. The camera cleaning system (also referred to as washing system) according to the technology disclosed in the present document may operate to keep a field of view of the camera 300 visually clean by performing camera cleaning operations as described in the present document.

Figure 2:
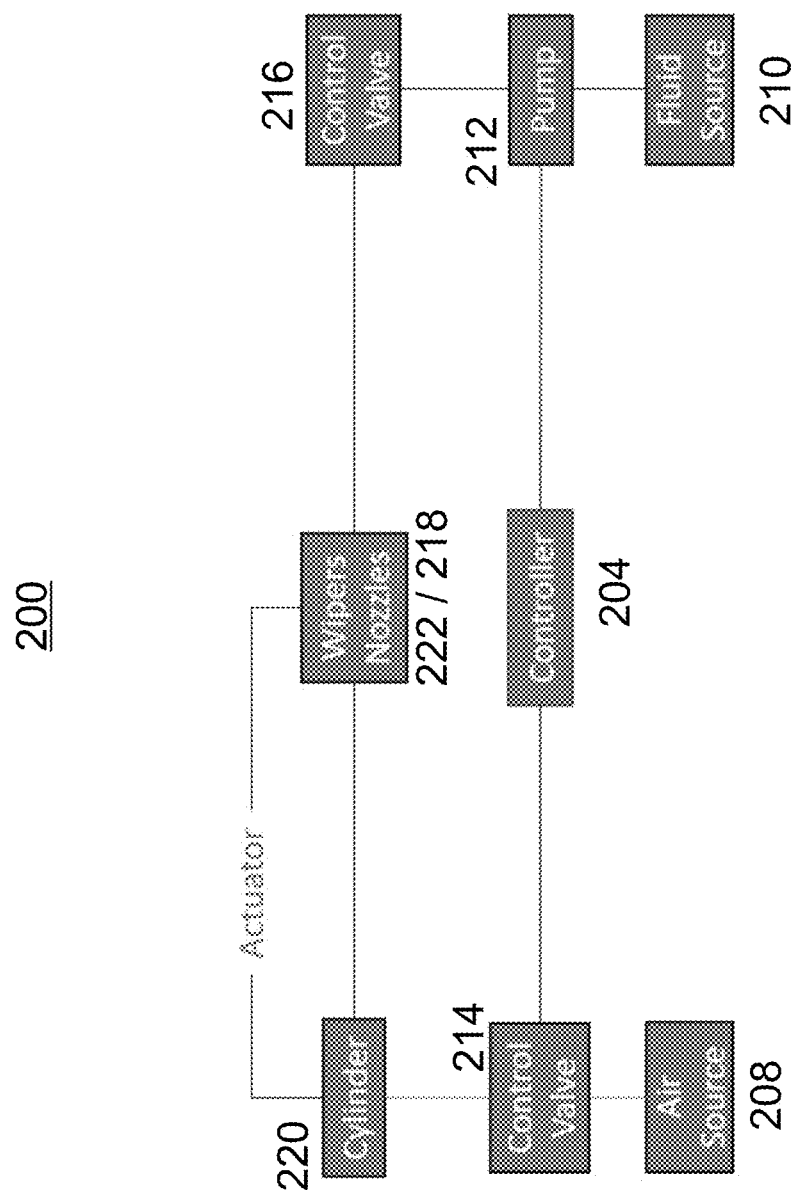
FIG. 2 shows a block diagram of an example camera cleaning system according to the disclosed technology.

FIG. 2 shows a block diagram of an example camera cleaning system 200 according to the disclosed technology. The system 200 includes one or more of: a controller 204 comprising one or more processors; a high-pressure air source 208 (including, for example, an air tank coupled to one or more air cylinders 220 through a gas control valve 214); a cleaning fluid source (including, for example, a fluid tank 210); a pump 212 configured to pump a fluid from the fluid tank 210 through the liquid valve 216 to one or more nozzles 218. The system may also include control valves (liquid and/or gas), such as the ones shown as 214 and 216 in FIG. 2. One or more wiper mechanisms 222 may also be present in the camera cleaning system, along with various accessories (e.g., air and liquid pipes, cables, guide rails (also referred to as railways in this document), drive mechanism, fasteners, etc., which are not explicitly shown in FIG. 2). As shown in FIG. 2, the air cylinder 220 can actuate or can be a part of an actuation mechanism that actuates translational motion of a corresponding wiper. A power source that provides power to operate the fluid and wiper assemblies may be part of the camera cleaning system as an independent power source. Alternatively, or additionally, the camera cleaning system may be powered, for example, by the electrical power source for the autonomous vehicle, including a vehicle battery, or by a means that converts energy from a crankshaft of the vehicle into electricity or energy for fluid pumps or hydraulic and/or air actuators, or for both pumps and hydraulic and/or air actuators or systems.

The system 200 can work in conjunction with the autonomous driving system of an autonomous vehicle (not shown in the drawing). In some implementations, the autonomous driving system that controls navigation operations of the vehicle may be external to the system 200. The autonomous driving system may interface with the system 200 using, for example, signaling mechanisms whose functionality is described throughout this document.

As further described in this document, the cleaning system 200 may use two different cleaning mechanisms which may operate at the same time or independently.

Figure 3:
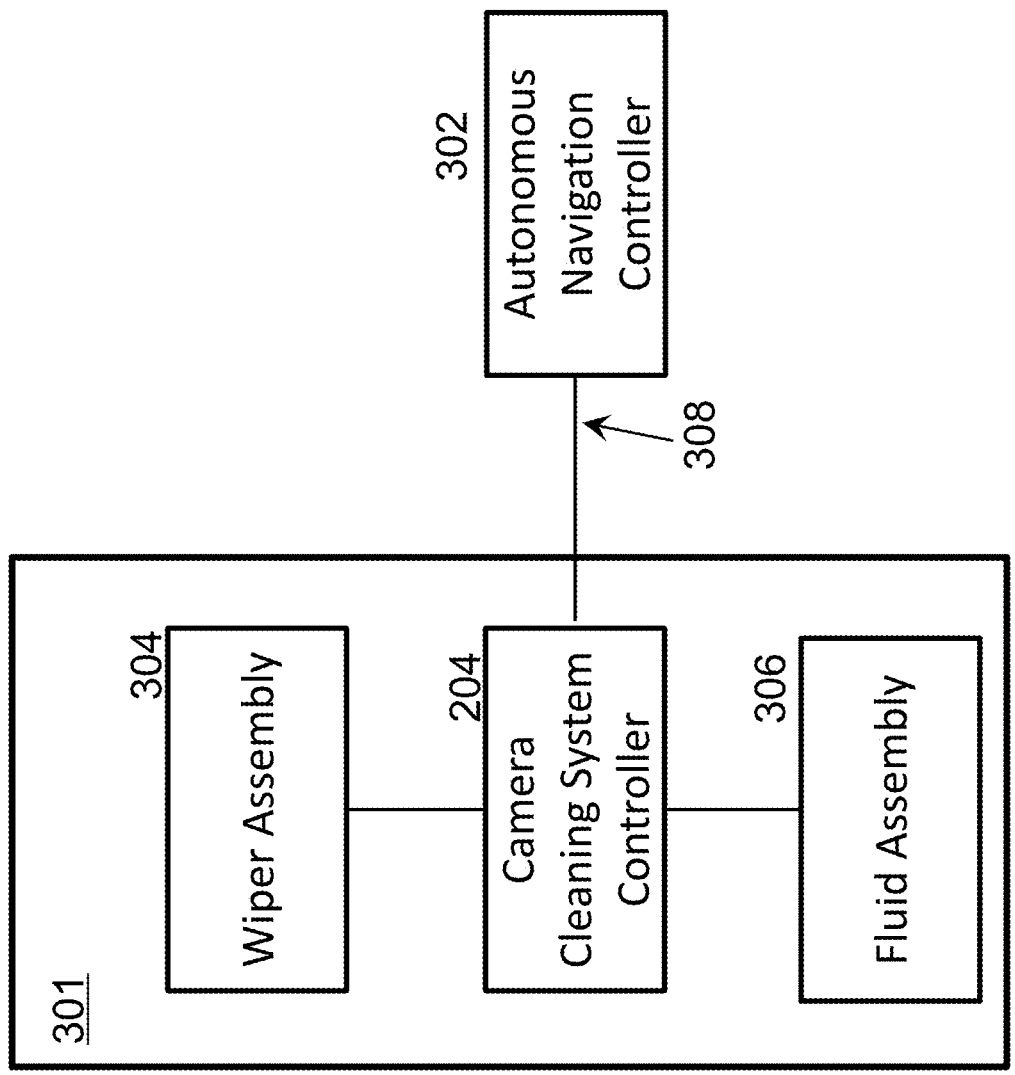
FIG. 3 shows a diagram of an example camera cleaning system of an autonomous vehicle according to the technology disclosed herein.

FIG. 3 shows a diagram of an example camera cleaning system 301 in which a camera cleaning operation may be performed while the system is in communication with an autonomous navigation controller (ANC) 302 that is configured to navigate the autonomous vehicle on which, for example, the camera (300 in FIG. 1) is affixed. The ANC 302 interfaces with the camera cleaning system controller 204 that in turn controls the operation of the wiper assembly 304 and the fluid assembly 306, e.g., as described in the embodiment illustrated in FIG. 2.

In some embodiments, the camera cleaning operations performed by the system 301 under direction of the controller 204 may be stand-alone and relatively independent of the operation of the ANC 302. Alternatively, or in addition, the camera cleaning system controller 204 may operate in conjunction with the ANC 302, e.g., based on one or more inputs received from the ANC 302 via the interface and/or communication link 308 regarding driving conditions, etc. The interface 308 may be a wired or wireless interface carrying signals that communicate information related to the operation of the autonomous vehicle and/or quality of images being captured from the camera 300 of the autonomous vehicle, as is further described in the present document. The interface 308 may be, for example, a control area network (CAN) bus interface. For example, during coordinated operation of the camera cleaning system controller 204 and the ANC 302, when a trigger of a cleaning request is sent to the camera cleaning system controller 204 from the ANC 302 (or, alternatively, sent to the camera cleaning system controller 204 in response to an action of a human driver), the controller 204 may activate the wiper assembly 304 and the fluid assembly 306 such that the pump (212 in FIG. 2) starts operating, the control valves 214 and/or 216 become open thus causing, among other effects, the nozzle 218 to spray the cleaning (also referred to as washing) fluid on the camera surface that needs to be cleaned (e.g., a glass surface of the camera lens). The operation of the air control valve 214 causes the cylinder 220 to move at a desired speed under the influence of pressurized air from the air source 208 such that to actuate a lower arm of the wiper assembly attached to the cylinder and an upper arm of the wiper assembly attached to the lower arm via a hinge to move along the guide rails (railway) of the wiper assembly to which the lower arm is movably attached, thus causing the wiper blade attached to a distal end of the upper arm to swipe across the camera surface to remove dirt and other occlusions from the surface.

Figure 4:
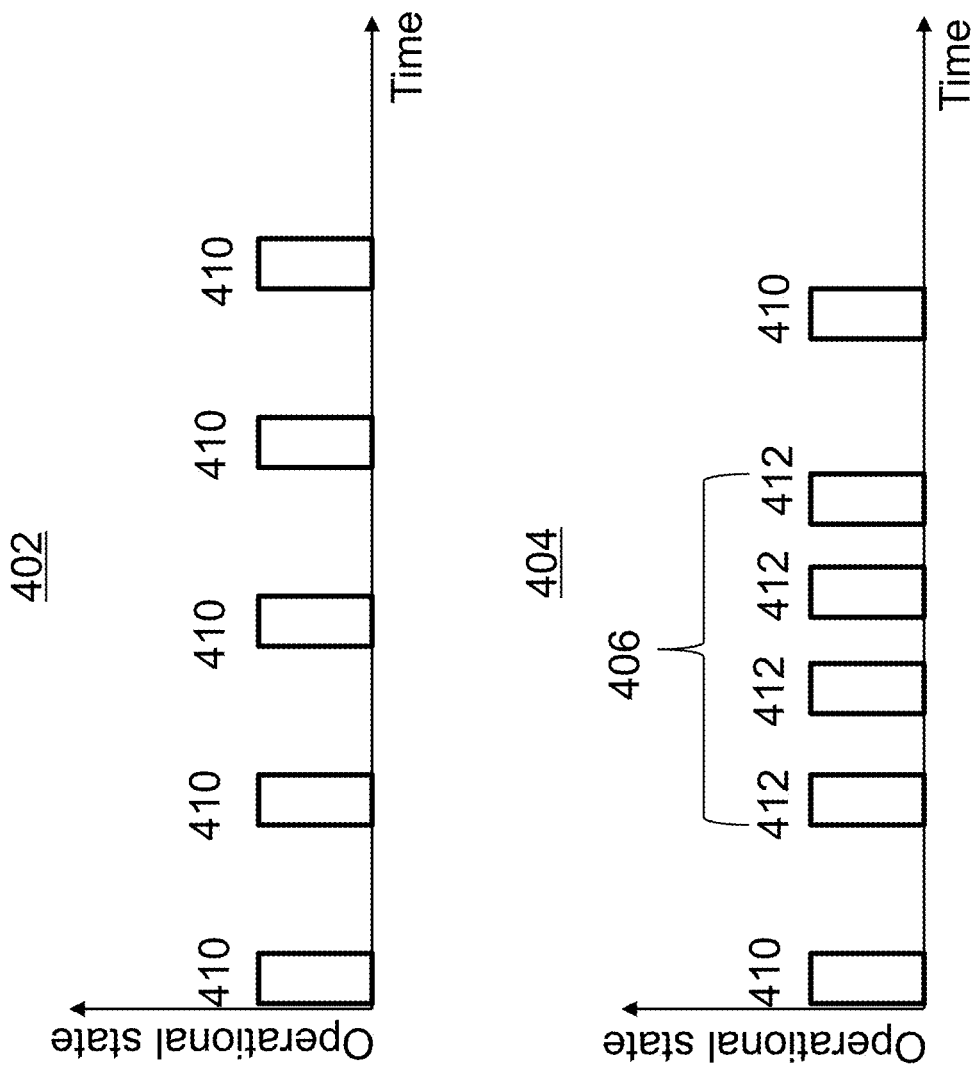
FIG. 4 shows example timelines for operation of a camera cleaning system according to the disclosed technology.
Figure 5:
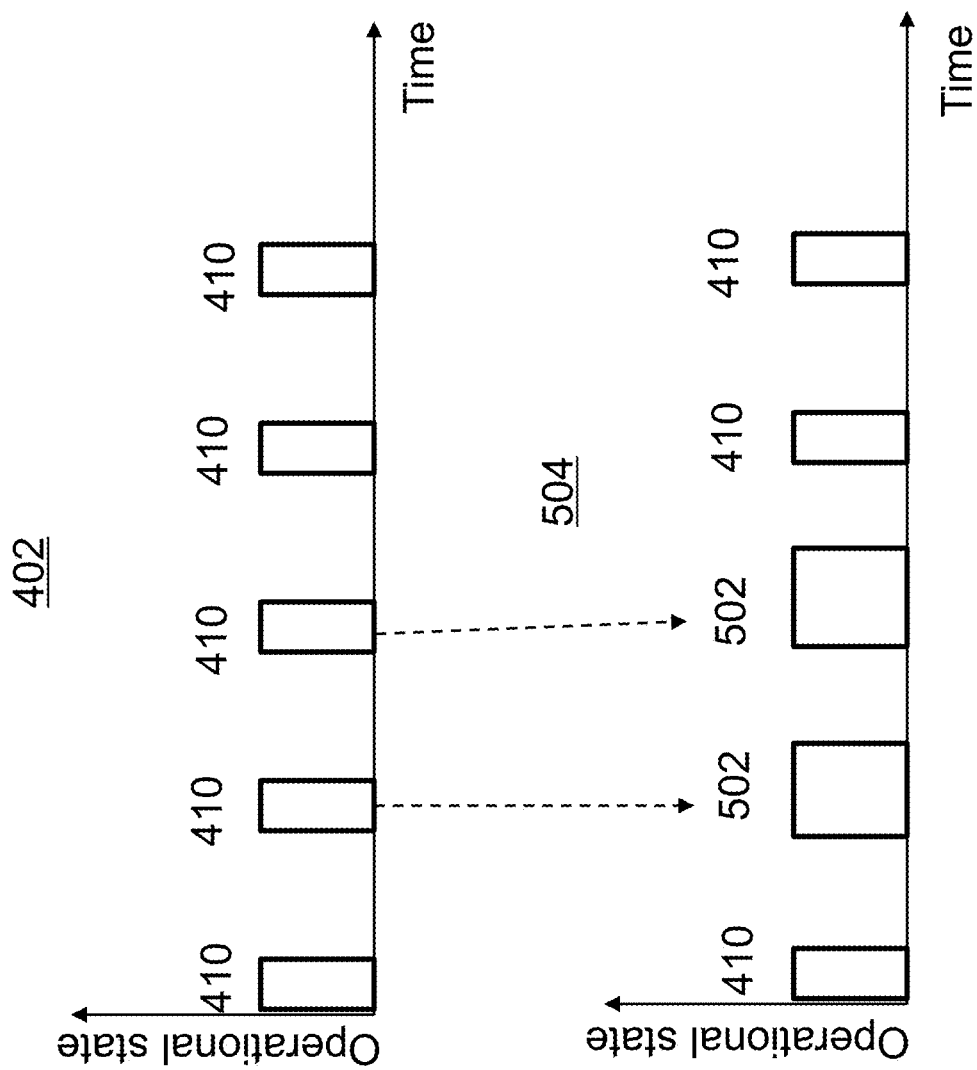
FIG. 5 shows other example timelines for operation of a camera cleaning system according to the technology disclosed in this patent document.
Figure 6:
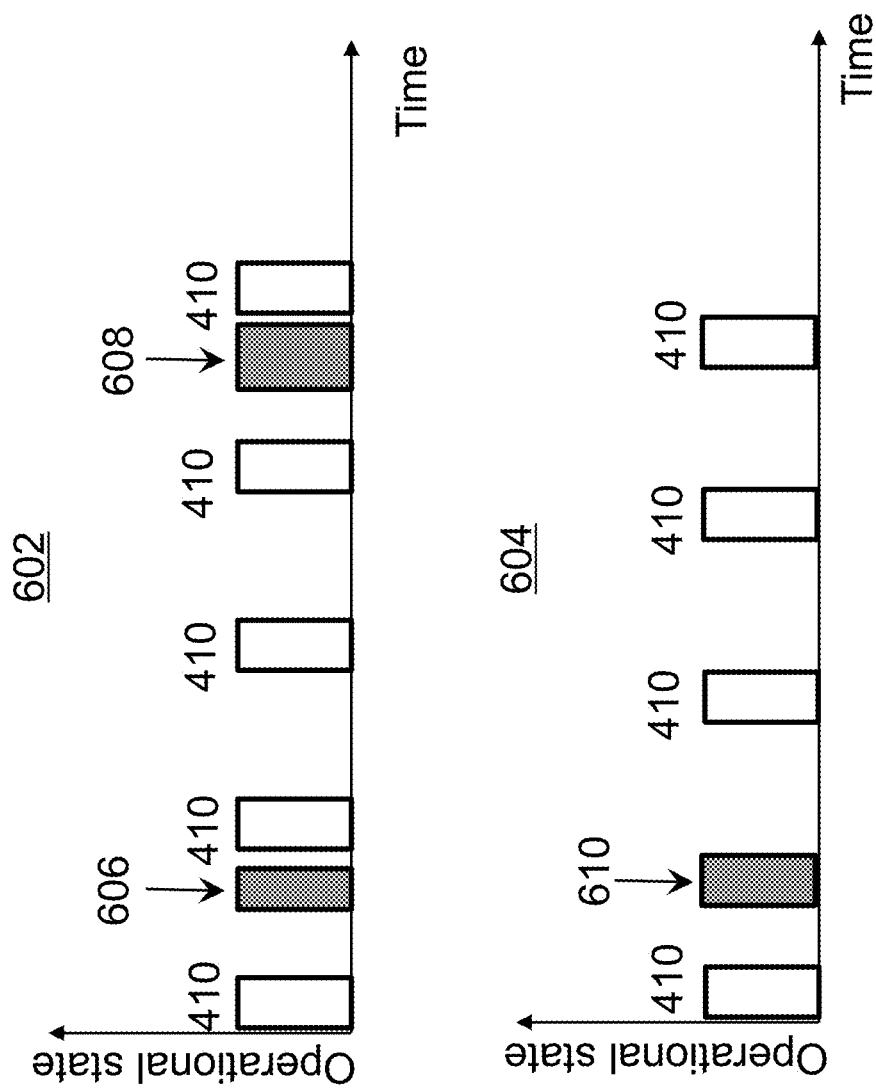
FIG. 6 shows example timelines for operation of a camera cleaning system according to the disclosed technology.

FIGS. 4 to 6 show example graphs of timelines of operation of a camera cleaning system according to the disclosed technology. In FIGS. 4-6, the horizontal axis represents time, and the vertical axis represents operational state of the fluid and/or wiper assemblies of the system, shown as pulses when the assemblies are operating to perform the camera cleaning operation. Widths of these pulses are intended to indicate a duration of operation of the wiper and/or spraying of the fluid to clean the camera surface and/or an intensity of operation (e.g., spraying force or flow of the fluid or a number of repetitions of the back-and-forth wiper movements). This aspect is further described in the present document.

FIG. 4 shows a graph 402 that depicts a timeline of operation of the wiper assembly and/or the fluid assembly of a camera cleaning system according to the disclosed technology. In the mode of operation illustrated in the graph 402, the wiper assembly, and optionally the fluid assembly, is periodically activated to perform one or more camera cleaning operations, as indicated by pulses 410. A camera cleaning operation can include, for example, a cleaning movement of a wiper blade of the wiper assembly across a surface which needs to be cleaned (such as a camera lens). A camera cleaning operation can also include, for example, spraying a cleaning fluid onto the surface that needs to be cleaned. In absence of other considerations, each pulse 410 may be of the same width, indicating that the wiper assembly and/or the fluid assembly may be operated to perform repetitive cleaning operations 410, spaced by the same "uniform" time period (referred to as uniform cleaning operations in this patent document). Each of the pulses 410 in FIG. 4 can correspond to a certain number of the wiper movements across the camera surface that needs to be cleaned performed during the duration of the pulse, as shown in FIG. 4 and/or to a certain number of times the cleaning fluid is sprayed onto the camera surface that needs to be cleaned.

FIG. 4, graph 404, shows another example mode of operation. Here, instead of a uniformly spaced sequence of the wiper assembly operations, and, optionally, cleaning fluid assembly operations, during a time period 406, the wiper and fluid assemblies may be operated more rapidly, as indicated by the occurrences of pulses 412 spaced closer to each other along the time axis compared to the spacing of the pulses 410 in the graph 402. Such may be the case, for example, when it is determined that an environmental condition dictates that the camera cleaning be performed more often and/or faster. For example, during rain, or while driving on a muddy or a dusty road, the camera surface may accumulate dirt at a faster rate, thus needing camera cleaning operation to be performed at a faster than normal rate. After the environmental condition subsides, as shown in the graph 404, at the end of the time period 406, the system may return back to the normal pace of operation.

FIG. 5 shows a comparison between the baseline uniform mode of operation, as depicted in the previously described graph 402 with a mode of operation depicted in the graph 504. As depicted in the graph 504, the cleaning operation at time instances 502 is shown with a broader pulse width, indicating that the wiper or the fluid assembly is controlled to operate more intensely to achieve better cleaning. For example, in some embodiments, as compared to each cleaning iteration at pulses 410 shown in the graph 402, the wiper may sweep across the camera surface a greater number of times for each cleaning iteration represented by the pulse 502. For example, the pulse width for pulse 410 may represent two wiper sweeps across the camera surface for each occurrence of the pulse 410. Compared to that, pulse 502 may represent 4 (or another number greater than 2) wiper sweeps.

FIG. 6 illustrates another mode of operation of the camera cleaning system according to the disclosed technology. Graph 602 shows a timeline in which camera cleaning operations are performed as a combination of two operations: a periodic cleaning operation, as indicated by the periodic pulses 410 and an "as-needed" cleaning operation, as indicated by pulses 606 and 608. For example, the as-needed cleaning may be performed in cases when the environmental or external conditions are such that the periodic cleaning operation may not be sufficient. For example, the vehicle may be driving on a road that is generating more than normal dust or has a lot of flying insects or other driving impairments such as rain and/or snowfall.

Graph 602 also highlights another aspect of the as-needed cleaning operation. As an example, the as-needed cleaning operation may be performed with different intensities or repetitions based on determination regarding the need. For example, the as-needed cleaning operation represented by the pulse 606 is of a different duration or intensity compared to the as-needed cleaning operation represented by the pulse 608. In the depicted example, the wiper may be controlled to make more sweeps across the camera lens surface during the time interval corresponding to the pulse 608 compared to the pulse 606. Similarly, the intensity of cleaning fluid spraying may also be controlled proportionally to the relative width of the pulses. In some embodiments, the characteristics (e.g., duration, number of wiper blade sweeps across the camera lens surface, sweep intensity (e.g., speed at which the wiper blade moves across the camera lens surface), amount of the cleaning fluid dispersed, etc.) of the uniform pulses 410 and the as-needed pulses 606, 608 may all be individually controlled and different from each other.

In the example embodiment depicted in graph 602 in FIG. 6, the as-needed camera cleaning operations 606 and 608 is superimposed on the uniform cleaning operations 410 without making any change to the periodic occurrence of the pulses 410. For example, the uniform cleaning operations may always occur at a given periodicity, whether or not there are any intervening as-needed cleaning operations.

Graph 604 in FIG. 6 shows another example embodiment of superimposition of the uniform cleaning operation and the as-needed cleaning operations. In this example, due to occurrence of an as-needed cleaning pulse 610, the periodicity of the uniform cleaning may be reset such that, after the pulse 610, the period of the uniform cleaning becomes equal to the time difference between the end of the pulse 610 and the start of the next uniform pulse 410.

The example operation depicted in the graph 602 in FIG. 6 may be used, for example, when two different processors handle the uniform cleaning operation and the as-needed operation and may not be aware of each other's operation. Therefore, each processor may operate the fluid assembly and/or the wiper assembly independent of each other. The example operation depicted in the graph 604 in FIG. 6 may be implemented, for example, in embodiments in which a single master processor controls operation of the fluid assembly and/or the wiper assembly to ensure that occasional as-needed cleaning operations are accommodated while maintaining the general uniform cleaning operation.

As depicted in FIGS. 4-6, when using the first mechanism of uniform operation, the wiper starts a cleaning cycle every certain time period. A cleaning cycle may comprise N sweeps by the wiper along the camera surface. N may be a pre-selected integer number. Typical values of N may be between 1 and 10. N may be configured based on operational conditions. For example, in harsher weather, N may be selected to be a larger number as compared to the number of cleaning sweeps in friendly or calmer weather. The value of N may be proportional to the corresponding width of the pulses shown in and described with respect to FIGS. 4-6.

The second mechanism for the as-needed cleaning includes activating the cleaning process when, for example, a camera (or one or more processors processing images from the camera) detects that dirt on the camera affects the cameras' fields of view or when there is no distinct dirt accumulation (e.g., on the lens of the camera) but the quality of the images captured by the camera has deteriorated and negatively influenced the autonomous vehicle's perception of its surroundings.

For the first mode or mechanism of operation, a "lower", or a "slave", computer that includes a processor may be set up in a fixed operating mode and such it will control all actuators to work properly. The second mode or mechanism of operation may include a different processor such as an "upper" computer (e.g., a processor that is a part of or communicates with the autonomous driving system). The second mechanism (or the upper computer) may have a higher control priority compared to the first mechanism (or the lower computer). The second mechanism may activate sporadically such as when a camera detects that its lenses need to be cleaned or a degradation in the image quality from a camera is detected.

Figure 7:
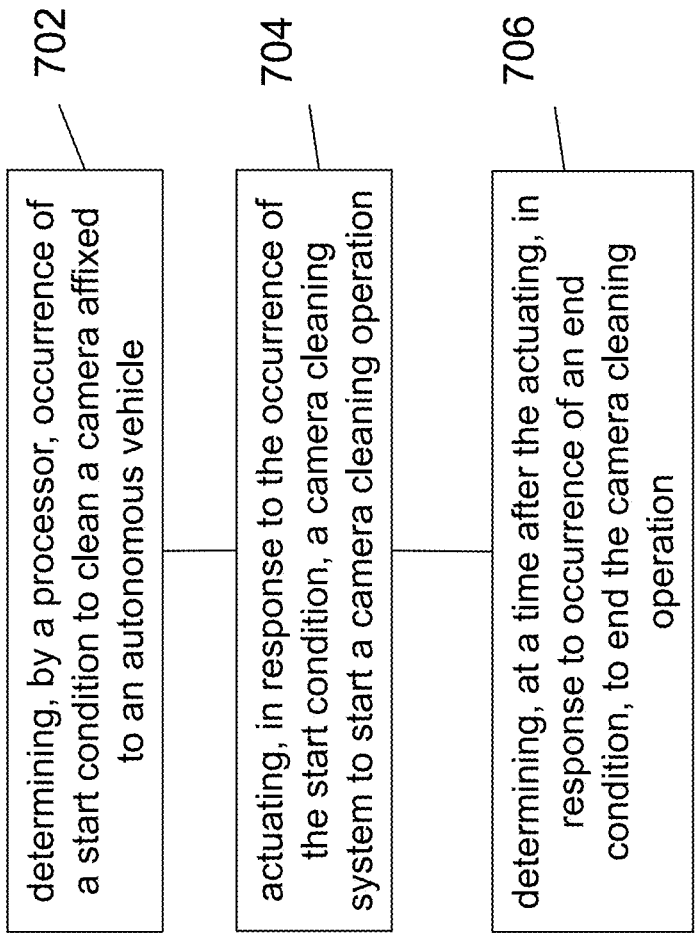
FIG. 7 shows a flowchart for an example method of operation of a camera cleaning system according to the technology disclosed herein.

FIG. 7 illustrates a flowchart for an example method 700 of operation of a camera cleaning system according to the disclosed technology. The method may include the step 702 of determining or detecting an occurrence of a start condition that indicates that cleaning of a camera (or an element or a surface of the camera) affixed to an autonomous vehicle is required. The determination can be done, for example, using a processor located in the autonomous vehicle. The determination may be based on various factors and data such as those described above. For example, the determination can be made based on a criterion related to quality of the images captured by the camera. If, for example, the processor detects that image quality has deteriorated to a certain degree, the processor can determine that the start condition that indicates a need to clean the camera has occurred. The image quality deterioration can be determined or measured, for example, based on detecting that a certain area of the images obtained by the camera becomes occluded irrespective of the camera view. Other criteria that use one or more parameters or characteristics (e.g., brightness, sharpness, or contrast, etc.) of an image or of a series of images obtained by the camera can be used to determine if the image quality provided by the camera has diminished. The method can also include the step 704 of actuating a camera cleaning system to start a camera cleaning operation or protocol. Actuating the camera cleaning system can be, for example, in response to determining, in the step 702 of the method, that a condition that requires cleaning the camera has occurred. Additionally, the method may include the step 706 of determining, after the actuating the camera cleaning system and in response to occurrence of an end condition, that the camera cleaning operation should end. The end condition can, for example, include disappearance of the start condition that caused actuating the camera cleaning system. For example, the processor can determine that quality of the images captured by the camera has improved after the initiation of the camera cleaning process.

Figure 8:
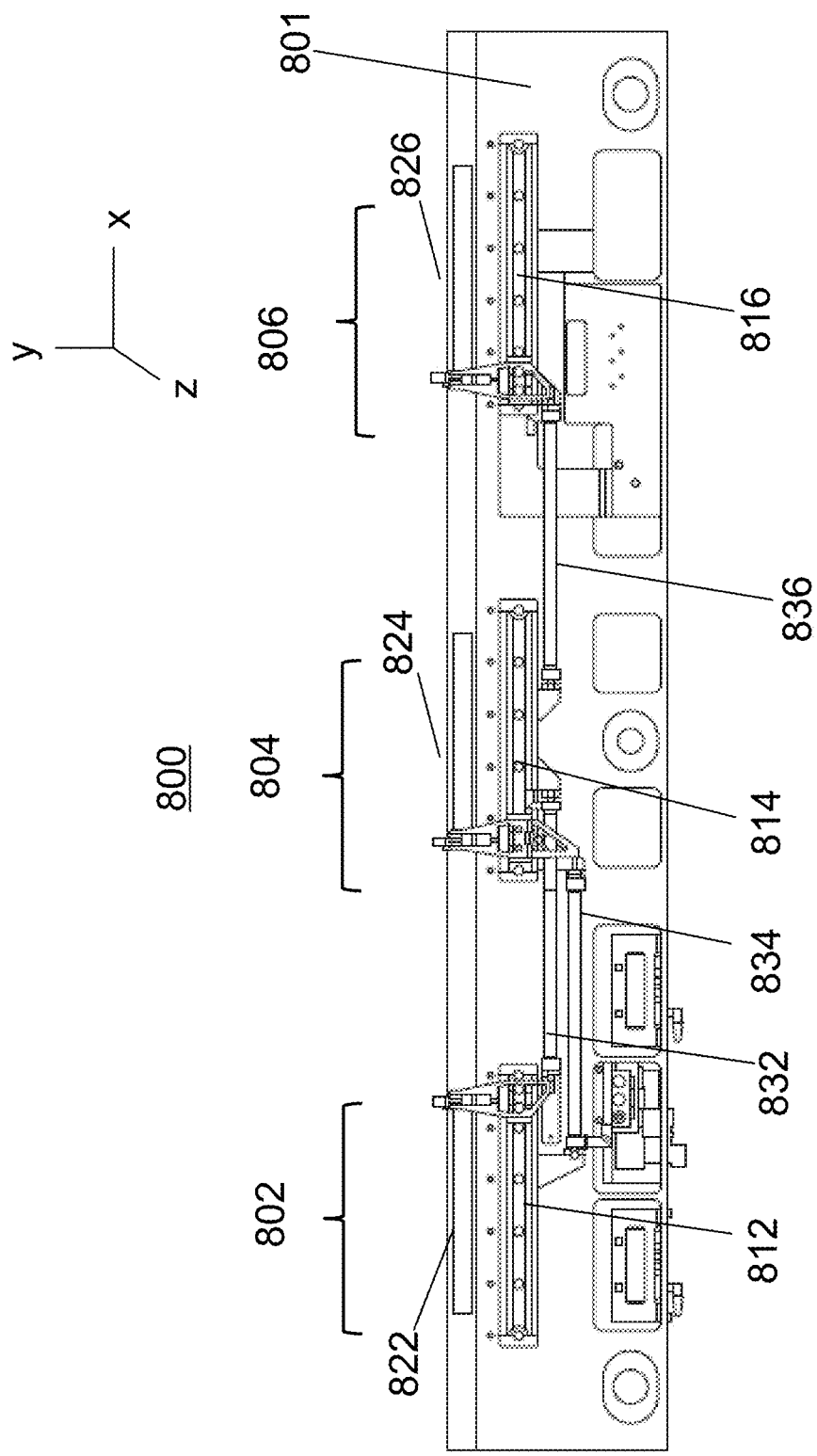
FIG. 8 shows a view of a bottom surface of an example camera cleaning system according to the disclosed technology.

FIG. 8 shows a bottom side view of an example embodiment of a camera cleaning system 800 according to the disclosed technology that includes three camera cleaning assemblies 802, 804, and 806, mounted on a single platform 801 which can be affixed to a vehicle. During operation, the platform 801 may be affixed to a vehicle such that the Y axis represents forward direction of the vehicle movement, and the X axis represents a direction perpendicular to the forward direction of the vehicle movement. The Z axis (coming out of the paper) represents the direction in which the platform 801 will be affixed to the vehicle (or represents the surface of the platform 801 that will be affixed to the vehicle).

Each camera cleaning assembly 802, 804, 806 includes a railway 812, 814, 816, respectively that holds a base of a corresponding wiper (not visible in the drawing). The railways 812, 814, 816 control movement of the wiper blades across three camera surfaces 822, 824, and 826, respectively. Each wiper has a base that shuttles back and forth across the respective railway 812, 814, 816 during a cleaning operation. The movement of the wiper is controlled using cylinders 832, 834, 836 connected to the base of the wiper for each camera cleaning assembly 802, 804, 806, respectively.

The cylinders 832, 834, 836 may be pneumatically operated and may form a part of the wiper assembly (304 in FIG. 3). Each cleaning assembly may also include a fluid spraying nozzle which may be a part of the fluid assembly as described previously.

The railways 812, 814, 816 may be composed of a weather-resistant and durable materials such as, for example, stainless steel. The railways 812, 814, 816 may stretch across and have a size along the X direction that is about the same as the extent of each camera cleaning surface (e.g., the surface of the camera that needs to be cleaned) 822, 824, 826, respectively. In the embodiment depicted in FIG. 8, each camera cleaning surface 822, 824, 826 is shown to be of the same size, but in general, the camera cleaning surfaces may have sizes that match those of the corresponding cameras that are expected to be used. The cylinders 832, 834, 836 may also be composed of weather resistant and durable materials such as, for example, stainless steel or aluminum. The fluid spraying nozzle may use brass material, for example. The wiper blades and the upper arms, further described in the present document, may be made of a durable and lightweight plastic material to enable their easy movement. In some embodiments, the railways and cylinders are bolted on the bottom of platform 801 such that they are mutually parallel.

During operation of the camera cleaning system depicted in FIG. 8, wiper bases move back and forth along the respective railways 812, 814, 816, thereby causing the corresponding wiper blades to wipe across the camera cleaning surfaces 822, 824, 826, respectively. To allow for a compact placement of the camera assemblies 802, 804 806 along both X and Y directions, the cylinders 832, 834, 836 can be placed offset from each other along the Y direction, thereby allowing simultaneous movement of the cylinders 832, 834, 836 back and forth along the X direction. Furthermore, the camera cleaning assembly 804 may be configured to move the corresponding wiper blade in a direction that is opposite to that of its neighboring camera cleaning assemblies 802 or 806. For example, at a given time, the wiper blade of the camera cleaning assembly 802 may be moving from left to right, while at the same time, the wiper blade of the camera cleaning assembly 804 moves from right to left, and vice versa. This out-of-phase wiper blade movement allows for even further compacting of the assemblies along the X direction, as can be seen by placement of the cylinders 832 and 834 to be overlapping almost completely along the X direction.

Figure 9:
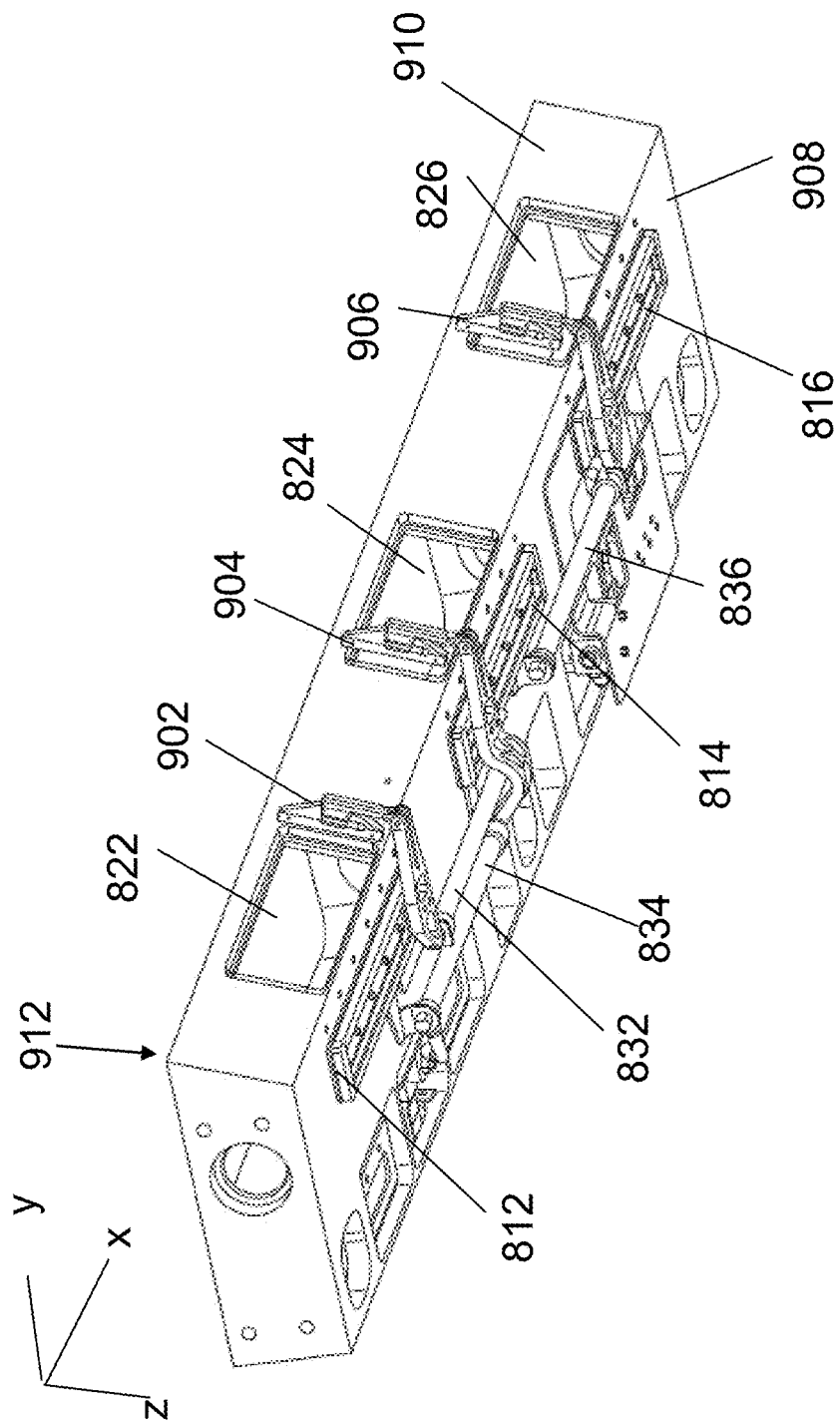
FIG. 9 shows a view of a front surface and a bottom surface of an example camera cleaning system according to the technology disclosed in this patent document.

FIG. 9 is a view of the system 800 (also shown in, e.g., FIG. 8) from a lower left direction. In this view, the front of the camera cleaning surfaces 822, 824, 826 are visible, as are the wiper blades 902, 904, 906 for each camera cleaning assembly 802, 804, 806 shown in FIG. 8, respectively. An inner space 912 in the system 800 may be provided to be sufficiently large to accommodate placement of one or more vehicle cameras (e.g., cameras 300) in it. As depicted in FIG. 9, the system 800 includes a bottom surface 908 and a front surface 910 that rises at an angle from the bottom surface 908. The camera cleaning surfaces 822, 824, and 826 can be openings in the front surface 910 of the system into the inner space 912 such that, when cameras are installed in the inner space 912, camera lenses are positioned in the openings (e.g., protrude through them) such that each of the wiper blades 902, 904 and 906 comes into contact with a surface of the corresponding camera lens (at least when a cleaning operation is performed; in between the cleaning operations, each wiper blade can be positioned on a side of the respective camera lens without obstructing the lens' view, for example). Alternatively, at least some of the camera cleaning surfaces 822, 824, 826 can include a transparent (e.g., glass) window installed in or in front or behind of the corresponding opening such that a camera installed in the inner space 912 of the system behind such a window could be better protected from the outside environment. The bottom surface 908 may be configured to be affixed to an autonomous vehicle (e.g., as shown in FIG. 1). The front surface 910 includes one or more camera cleaning surfaces 822, 824, 826, each with a corresponding wiper 902, 904, 906, respectively, that forms a part of the corresponding camera cleaning assembly (802, 804, 806 in FIG. 8, respectively). Each camera cleaning assembly can include a fluid assembly and a wiper assembly whose operations are controlled by a controller (not visible in FIG. 9).

Figure 10:
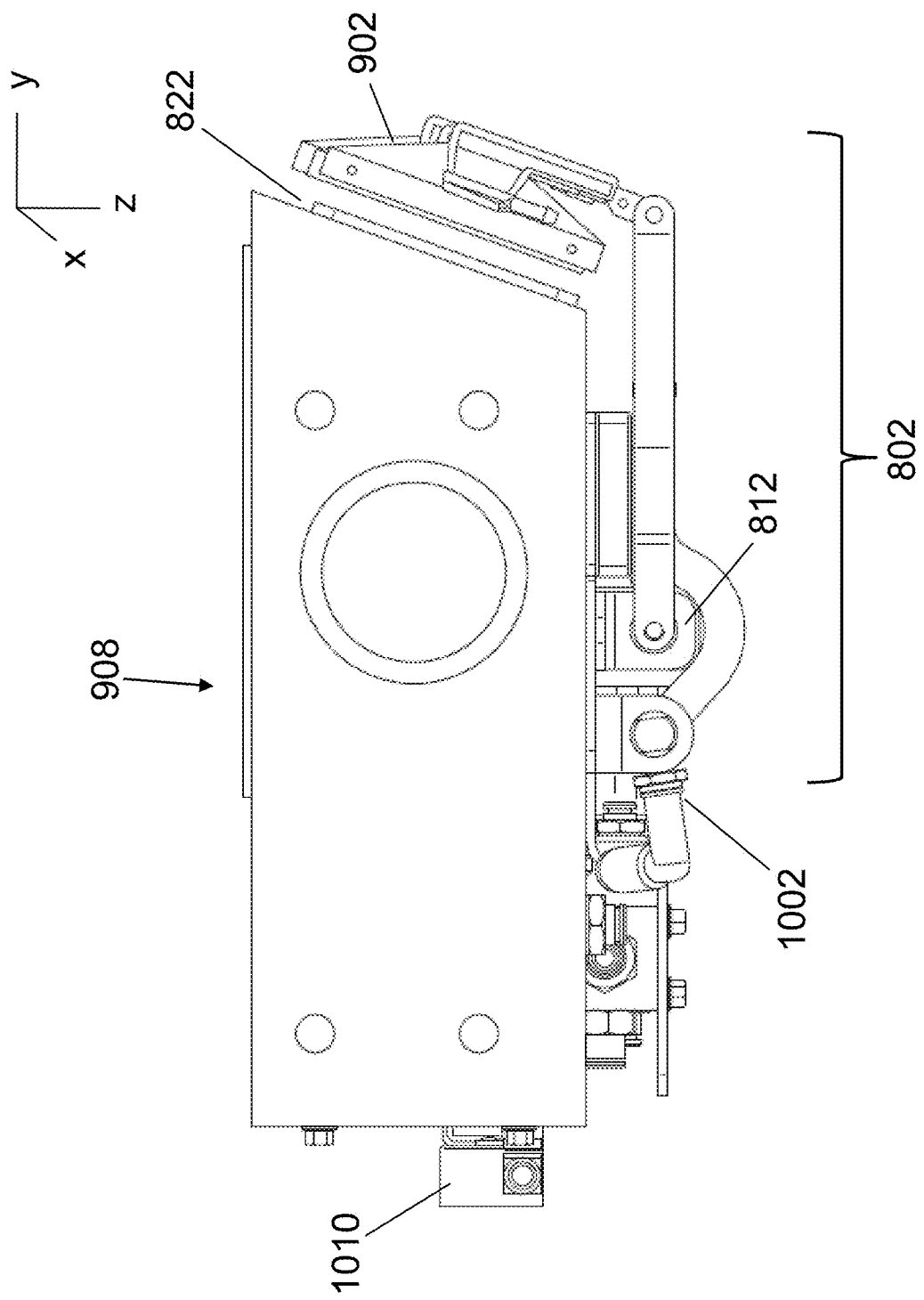
FIG. 10 shows a side view of an example camera cleaning system according to the technology disclosed herein.

FIG. 10 is a side view of the system 800. The wiper blade 902 of the camera cleaning assembly 802 can be seen extending along the vertical span of the camera cleaning surface 822 with the base of the wiper secured within the railway 812. An actuator 1002 can activate movement of a cylinder 832 which is not visible in this view. A protruding member 1010 in the backward direction (along the Y axis) may be used for securing the back side of the system 800 to the vehicle or the protruding member 1010 may serve another purpose, e.g., be used for allowing the connection of cables to a camera in the inner space 912 of the system. The other camera cleaning assemblies 804, 806 are not visible in this view, but their configurations can be substantially similar to that of the camera cleaning assembly 802, with each wiper blade 904, 906 oriented along the vertical span of a respective camera cleaning surface 824, 826 and with railways 814, 816 for guiding the motion of the wipers.

Figure 11:
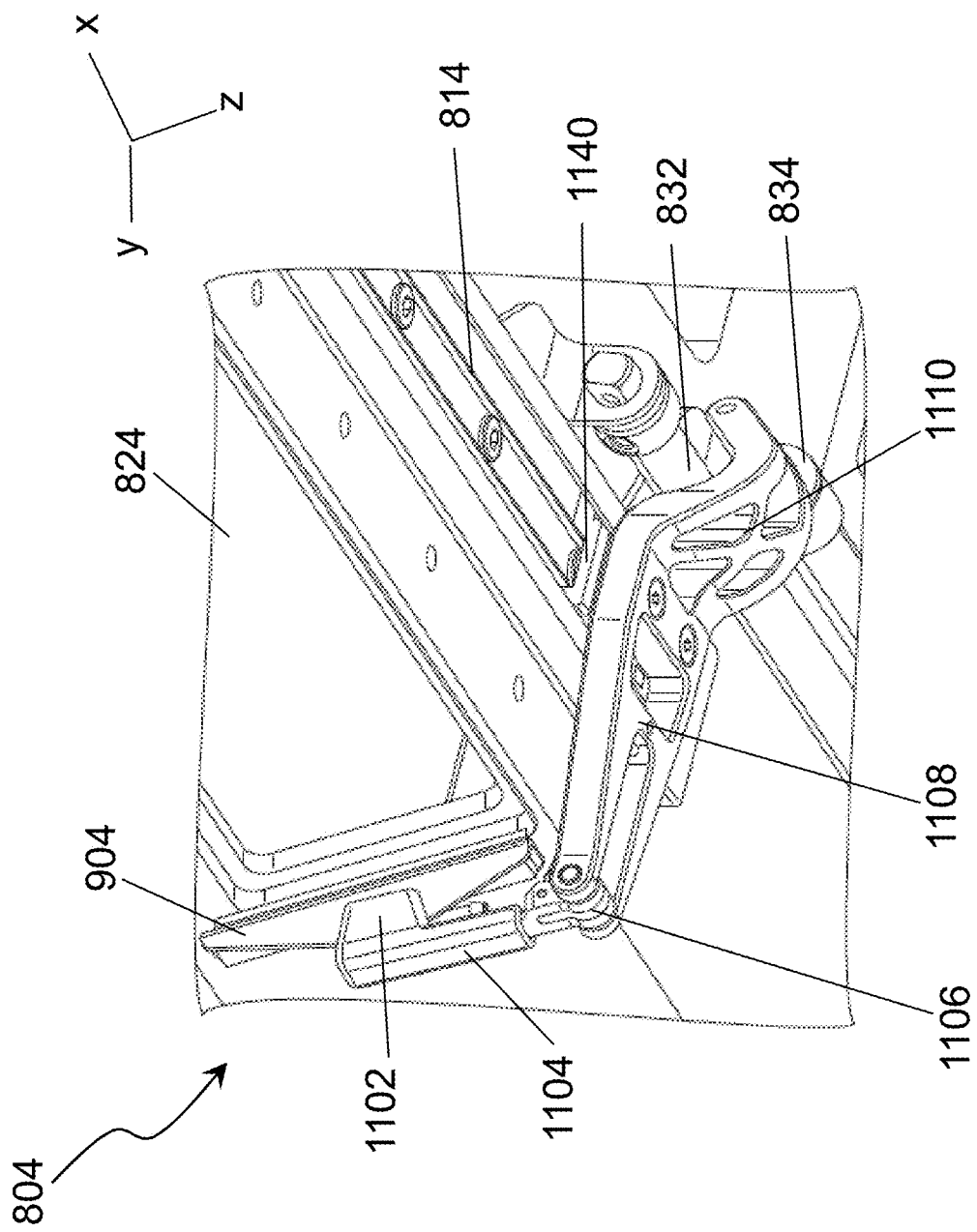
FIG. 11 shows a bottom side of an example wiper assembly of an example camera cleaning system according to the disclosed technology.

FIG. 11 depicts the camera cleaning assembly 804 in greater detail, in which details of the wiper assembly, in particular, are visible. Similar details are also present in camera assemblies 802, and 806, which are omitted from the view and discussion for brevity. The wiper assembly 804 includes a wiper blade 904 that is securely placed within a bracket 1102. The bracket 1102 is attached to a top end of an upper wiper arm 1104. The bracket 1102 holds the wiper blade 904 such that, during operation, the wiper blade 904 is configured to sweep across the camera cleaning surface 824. The upper wiper arm 1104 is coupled with a lower wiper arm 1108 via a hinge 1106 that allows movement of the upper wiper arm 1104 along the Y direction (out of the page in FIG. 11; e.g., a rotational movement of the upper arm 1104 in the YZ plane around the hinge 1106) upon exertion of a force on the upper arm. This movement may be used, for example, during manual cleaning and/or replacement of the wiper blade 904. The distal end 1110 of the lower wiper arm 1108 may be curved to wrap around the railway 814 and/or the cylinder 832 so as to allow free movement of the wiper assembly during operation. Alternatively, or additionally, the distal end 1110 of the lower wiper arm may be attached to a car 1140 that slides within the railway 814, as well as to a portion of the cylinder 834 that moves along the X direction.

Figure 12:
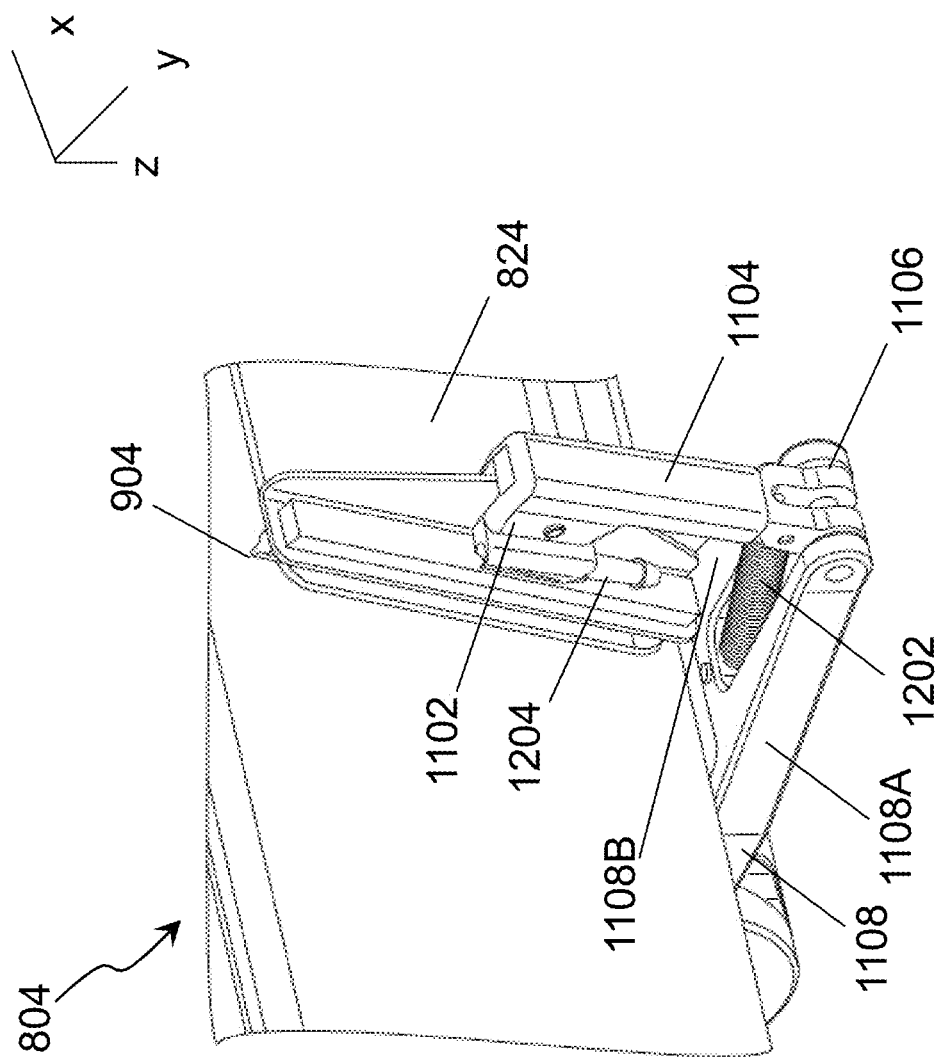
FIG. 12 shows a front view of an example wiper assembly of an example camera cleaning system according to the technology disclosed herein.

FIG. 12 shows a closer front view of the camera cleaning assembly 804, which depicts the placement of the wiper blade 904 over the camera cleaning surface 824, and the upper wiper arm 1104, the hinge 1106 and the lower wiper arm 1108. The lower wiper arm 1108 is shown to comprise two portions, 1108A and 1108B placed parallel to each other along the length of the lower wiper arm 1108 with a spring 1202 placed between the two portions. The spring 1202 may be used to ensure that the wiper blade 904 is in snug contact with the camera cleaning surface 824 during operation. A port 1204 can be connected to a fluid valve (e.g., the fluid control valve 216) that controls the flow of the cleaning fluid.

In some embodiments, the bracket 1102 and other moving parts may be made from aluminum. The spring 1202 may be composed of a tensile steel spring that pulls the wiper to make sure its blade 904 (made of, e.g., rubber) applies enough force to remove debris and the cleaning fluid from the camera cleaning surface 824 (e.g., window or camera lens). The camera cleaning assembly may also include a high-pressure air duct to carry pressurized air that dries the camera surface.

Figure 13:
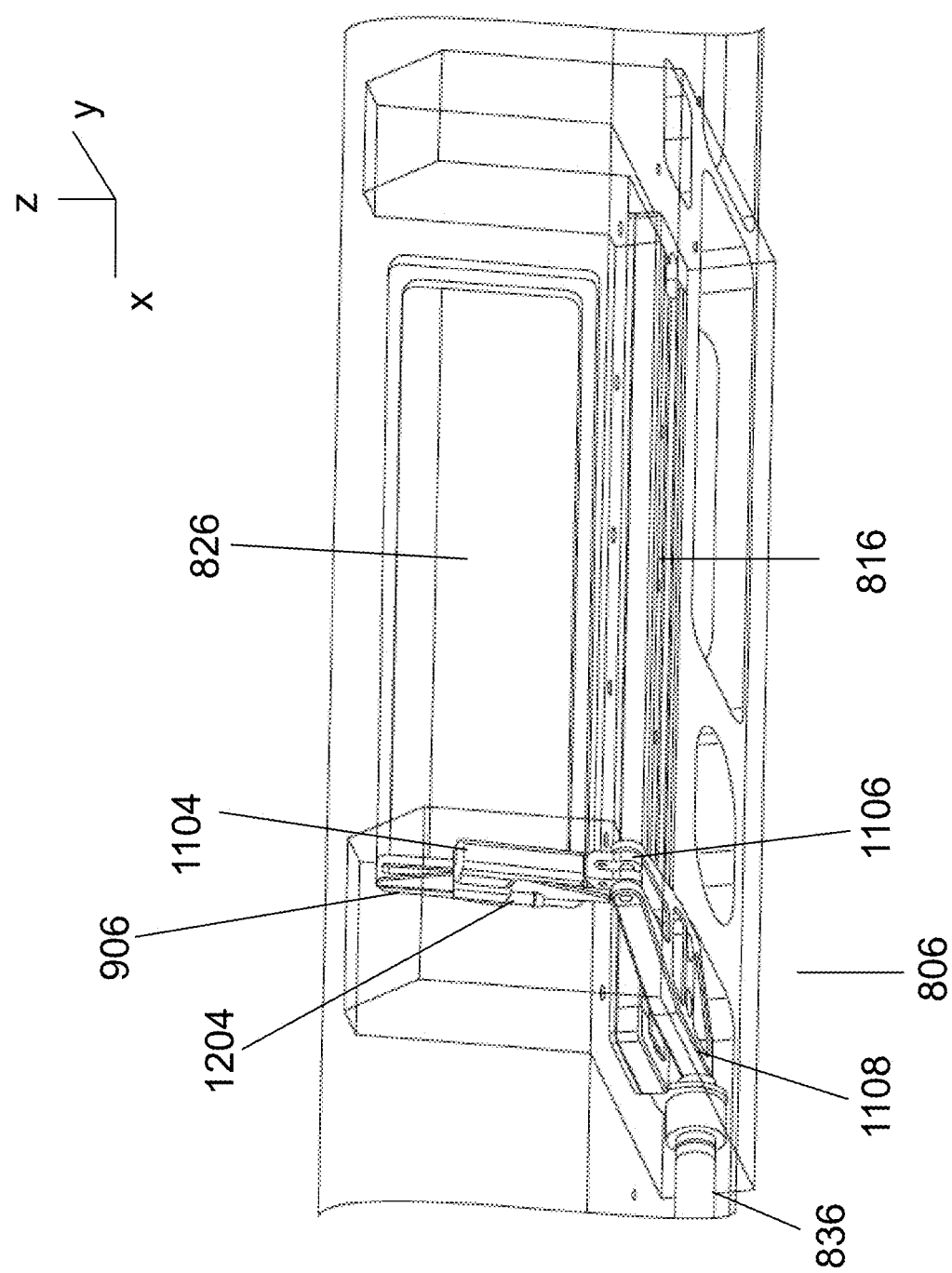
FIG. 13 shows a view of an example camera cleaning system according to the disclosed technology.

FIG. 13 shows a front view of the camera cleaning assembly 806, showing the wiper blade 906 at the left side of the camera cleaning surface 826. The railway 816 that guides the wiper motion and the cylinder 836 that transmits force to move the wiper along the railway 816 are also shown. The wiper assembly can also include the lower arm 1108 of the wiper that is (removably) attached to the cylinder 836, the hinge 1106 that connects the lower arm 1108 of the wiper to the upper arm 1104 of the wiper. The hinge allows the upper arm 1104 to be rotated (within a certain range of angular motion) in the YZ plane shown in FIG. 13. The ability to rotate the upper arm is helpful during replacement of the wiper blade 906, for example. The wiper assembly can also include the port 1204 for supply of a cleaning fluid.

The embodiments depicted in FIGS. 8-13 show a system 800 in which up to three cameras can be installed for autonomous driving operation. Note that, in various embodiments, the system 800 may be designed to hold different number of cameras, and additionally, or alternatively, the number of camera cleaning assemblies for which the system 800 is designed may be different from the actually installed number of cameras. A typical number of cameras placed in an autonomous vehicle may be two or three. As such, both of these configurations can be accommodated by a three-camera embodiment of a camera cleaning system according to the disclosed technology such as, for example, the one depicted in FIGS. 8-13. Each camera cleaning assembly includes its own cylinder, railway, wiper, nozzle, valve and accessories mentioned above.

Referring back to FIGS. 2-3, additional parts of the wiper assembly 304 and the fluid assembly 306 that are not visible in FIGS. 8-13 include a cleaning fluid source such as the cleaning fluid tank 210, for example, which, in some embodiments, can be a windshield fluid tank of the autonomous vehicle which may be located in the engine compartment or under the hood of the autonomous vehicle. The fluid assembly 306 can further include a fluid pump 212 that operates to pump, for example, the cleaning fluid for spraying the fluid on to the camera cleaning surface through a corresponding nozzle. In some embodiments an immersed fluid pump can be integrated into the windshield fluid tank 210. In some embodiments, with reference to the wiper blade 902 and the bracket 1102, the fluid ejecting nozzle and the wiper may be integrated together. In some example embodiments of the cleaning system, spraying of the fluid through the nozzle will trigger cleaning movements of the wiper blade. The wiper assembly 304 may further include a control valve 214 for controlling air movement through an air cylinder. The valve 214 may use a solenoid for activation/deactivation of the valve 214. The fluid assembly may include a fluid valve 216 that may control movement of the cleaning fluid. The fluid valve 216 may use a solenoid for controlling opening/closing of the valve. The air and fluid solenoid valves may be hidden in the camera housing or somewhere else in the autonomous vehicle.

An aspect of the disclosed embodiments relates to a method of cleaning a camera installed on an autonomous vehicle. The method includes determining, using a processor, an occurrence of a condition to clean a camera affixed to an autonomous vehicle. The method also includes actuating, in response to determining the occurrence of the condition, a camera cleaning system to start a camera cleaning operation. The method further includes determining to end the camera cleaning operation, at a time after the actuating, in response to an occurrence of an end condition.

The following features can be present in the method in any reasonable combination. Actuating the camera cleaning system may include actuating a wiper system to cause a wiper to wipe a surface of the camera (e.g., a surface of the camera's lens or objective) or a surface disposed in front of the camera (e.g., a glass window) through which the camera observes its surroundings and, additionally or alternatively, actuating a fluid pump to cause a cleaning fluid to be sprayed on the camera surface during the camera cleaning operation. Actuating the wiper system may include causing an air valve to open to allow air under a high pressure to travel from an air tank through an air cylinder toward the surface of the camera. Actuating the fluid pump may include controlling the fluid pump to pump the cleaning fluid from a fluid storage tank. Actuating the fluid pump may, additionally or alternatively, include controlling a liquid valve to cause the cleaning fluid to undergo pressurization such that the cleaning fluid is prayed on the surface of the camera to be cleaned. Determining the occurrence of the condition to clean a camera may include determining that an amount of time (e.g., a predetermined amount of time) has elapsed since a previous camera cleaning operation. Determining the occurrence of the condition to clean a camera may include receiving a message from a controller of the autonomous vehicle that the camera needs to be cleaned. The message from the controller of the autonomous vehicle may be generated due to sensing a degradation in a visual quality of the images captured from the camera.

Another aspect of the disclosed embodiments relates to a camera cleaning system. The camera cleaning system includes a wiper assembly configured to control operation of a wiper blade for cleaning a camera surface. The system also includes a fluid assembly configured to spray a fluid on the camera surface to be cleaned. The system can further include one or more processors configured to control operations of the wiper assembly. The system may also include one or more processors configured to control the fluid assembly. The same processor or processors can be used to control both the wiper assembly and the fluid assembly.

The following features may be present in the camera cleaning system in any suitable combination. In the system, control of the wiper assembly, and, optionally, control of the fluid assembly, may be a function of a quality and/or a state and/or a condition of the camera surface. For example, the quality can be a visual (e.g., an optical) quality of the surface. The one or more processors may be configured to determine the function or state of the visual quality of the camera surface based on detecting visual occlusions on the camera surface. The one or more processors may be configured to determine the function or state of the visual quality of the camera surface by comparing a perceived quality of a reference object in one or more images obtained by the camera with a reference quality for the reference object prestored in a memory. In such a system, the reference object can be a road marker, for example. The one or more processors can be configured to control an intensity and/or a duration of operation of the wiper assembly and/or the fluid assembly based on a rate of improvement of the visual quality of the camera surface during a time that the wiper assembly and/or the fluid assembly are operating.

Alternatively, control of the wiper assembly, and, optionally, of the fluid assembly, may be based on a control signal received from a controller of an autonomous vehicle. The control signal may be indicative of a period of intermittently operating the wiper assembly and/or the fluid assembly. In such a system, the control signal received from the controller may specify either a first mode of operation in which both the wiper assembly and the fluid assembly are to be activated or a second mode of operation in which the wiper assembly is to be activated without activating the fluid assembly. The controller may select between the first mode and the second mode based, for example, on an environmental condition around the autonomous vehicle. The one or more processors of the system may be also configured to receive a feedback signal from the fluid assembly that is indicative of an amount of fluid in a storage tank of the fluid assembly and to provide an external signal to indicate that the amount of the fluid has fallen to a level that needs a refill. The wiper assembly and the fluid assembly may be operated intermittently at different periodicities in the camera cleaning system.

In the camera cleaning system, the control operation of the wiper assembly and the fluid assembly may include controlling a fluid pump to cause a spray of a fluid from a fluid tank to be ejected from a nozzle onto the camera surface that needs to be cleaned. Activating an electric motor to cause a wiper to sweep across the camera surface to be cleaned may be a part of the control operations as well. In the control operations, controlling the fluid pump and activating the electric motor may be performed simultaneously or at different times. The control operations may also include opening a fluid valve to allow the spray fluid to travel from the fluid tank to the nozzle.

Yet another aspect of the disclosed embodiments relates to a camera cleaning system that includes a housing having a base surface and a front surface, wherein the front surface is joined to the base surface at an angle. The camera cleaning system also includes one or more openings on the front surface of the housing. The camera cleaning system further includes one or more camera cleaning assemblies affixed to the housing. Each camera cleaning assembly includes a wiper blade configured to translationally move (e.g., in a linear fashion or along a curved path (e.g., an arc of a circle)) back-and-forth across a corresponding camera surface. In the camera cleaning system, each of the one or more openings includes one of the corresponding camera surfaces.

The following features may be present in the camera cleaning system in any reasonable combination. Each camera cleaning assembly may also include a railway (e.g., one or more guiding rails) affixed to the bottom surface and a wiper assembly that has a lower arm movably secured to the railway and an upper arm coupled to the lower arm via a hinge. The upper arm of the wiper assembly may have the wiper blade at a distal end. The system may include an air duct coupled to the base surface and positioned to extend through the upper arm of the wiper assembly towards the wiper blade. The air duct may have a nozzle at an end near the wiper blade, such that the nozzle is positioned to eject air under high pressure towards the camera surface. A fluid duct may be coupled to the base surface and positioned to extend through the upper arm of the wiper assembly towards the wiper blade. The fluid duct may have an opening at an end near the wiper blade, the opening being positioned to eject a fluid towards the camera surface. The system may be configured in such a way as to cause the wiper blade to move (e.g., trigger the wiper blade movement though, for example, a controller or a processor) in a linear back-and-forth fashion in response to the fluid being ejected from the opening. The railways of the one or more camera cleaning assemblies may be placed parallel to each other along a direction in the camera cleaning system.

An aspect of the disclosed embodiments relates to a method of cleaning a camera, comprising: determining, by a processor, an occurrence of a condition to clean a camera affixed to an autonomous vehicle; actuating, in response to the occurrence of the condition, a camera cleaning system to start a camera cleaning operation; and determining, at a time after the actuating, in response to occurrence of an end condition, to end the camera cleaning operation.

In some example embodiments of the method of cleaning a camera, the actuating the camera cleaning system includes: actuating a wiper system to cause a wiper to wipe a surface of the camera; and actuating a fluid pump to cause a cleaning fluid to be sprayed on the surface of the camera during the camera cleaning operation. In certain example embodiments, the actuating the wiper system includes: causing an air valve to open to allow air under pressure from an air tank travel through an air cylinder towards the surface of the camera. According to some example embodiments, the actuating the fluid pump includes: controlling the fluid pump to pump the cleaning fluid from a fluid storage tank; and controlling a liquid valve to cause the cleaning fluid to undergo pressurization such that the cleaning fluid is sprayed on the surface of the camera. In some example embodiments, the determining occurrence of the condition includes determining that an amount of time has elapsed since a previous camera cleaning operation. According to certain example embodiments, the determining occurrence of the condition includes receiving a message from a controller of the autonomous vehicle that the camera needs to be cleaned. In some example embodiments of the method of cleaning a camera, the message from the controller of the autonomous vehicle is generated due to sensing a degradation in a quality of images captured from the camera.

Another aspect of the disclosed embodiments relates to a camera cleaning system, comprising: a wiper assembly configured to control movement of a wiper blade on a camera surface; a fluid assembly configured to spray a fluid on the camera surface; and one or more processors configured to control operations of the wiper assembly and the fluid assembly as a function of a quality of images obtained from the camera.

In some example embodiments of the camera cleaning system, the controlling the operations of the wiper assembly and the fluid assembly includes: controlling a fluid pump to cause a spray of the fluid from a fluid tank to be ejected from a nozzle on to the camera surface; and activating an electric motor to cause the wiper blade to sweep across the camera surface; wherein the controlling the fluid pump and the activating the electric motor are performed simultaneously. In certain example embodiments, the controlling the operations of the wiper assembly and the fluid assembly further includes opening a fluid valve to allow the fluid to travel from the fluid tank to the nozzle. According to some example embodiments, the one or more processors are further configured to determine the quality of images obtained from the camera by detecting visual occlusions on the camera surface via analysis of one or more images obtained from the camera. In some example embodiments, the one or more processors are further configured to determine the quality of images obtained from the camera by comparing a perceived quality of a reference object in one or more images obtained from the camera with a reference quality for the reference object prestored in a memory. In certain example embodiments, the reference object is a road marker. According to some example embodiments of the camera cleaning system, the one or more processors are configured to control an intensity of operation of the wiper assembly and/or the fluid assembly based on a rate of improvement of the quality of images obtained by the camera during a time interval that the wiper assembly and the fluid assembly are operating.

Yet another aspect of the disclosed embodiments relates to a camera cleaning system, comprising: a wiper assembly configured to control operation of the wiper for cleaning a camera surface; a fluid assembly configured to spray a fluid on the camera surface; and one or more processors configured to control operations of the wiper assembly, the fluid assembly, or both the wiper assembly and the fluid assembly intermittently based on a control signal received from a controller of an autonomous vehicle.

In some example embodiments of the camera cleaning system, the control signal received from the controller is indicative of a period of intermittently operating the wiper assembly and the fluid assembly. According to some example embodiments, the control signal received from the controller specifies one of a first mode, in which both the wiper assembly and the fluid assembly are to be activated, or a second mode, in which the wiper assembly is to be activated without activating the fluid assembly. In certain example embodiments, the controller selects between the first mode and the second mode based on an environmental condition around the autonomous vehicle. In some example embodiments, the one or more processors are further configured to receive a feedback signal from the fluid assembly indicative of an amount of the fluid in a storage tank of the fluid assembly and provide an external signal to indicate that the amount of the fluid has fallen to a level that needs a refill. According to certain example embodiments, the wiper assembly is operated intermittently at a first periodicity and the fluid assembly is operated intermittently at a second periodicity which is different from the first periodicity.

An aspect of the disclosed embodiments relates to a camera cleaning system, comprising: a housing having a base surface and a front surface, wherein the front surface is fixedly attached to the base surface at an angle; one or more openings in the front surface; one or more camera cleaning assemblies affixed to the housing, each camera cleaning assembly comprising a wiper blade configured to perform linear back-and-forth movements across a corresponding camera surface, wherein each of the one or more openings comprises one of the corresponding camera surfaces.

In some example embodiments of the camera cleaning system, each camera cleaning assembly further comprises: guide rails affixed to the bottom surface; a wiper assembly having a lower arm movably secured to the guide rails and an upper arm coupled to the lower arm via a hinge and having the wiper blade at a distal end. In certain example embodiments, the camera cleaning system further includes: an air duct coupled to the base surface and positioned to extend through the upper arm towards the wiper blade, wherein the air duct includes a nozzle at an end of the air duct near the wiper blade, the nozzle being positioned to eject air under a pressure towards the camera surface. According to some example embodiments, the camera cleaning system further includes: a fluid duct coupled to the base surface and positioned to extend through the upper arm towards the wiper blade, wherein the fluid duct includes an opening at an end of the fluid duct near the wiper blade, the opening being positioned to eject fluid towards the camera surface. In some example embodiments of the camera cleaning system, the guide rails of the one or more camera cleaning assemblies extend along a same direction.

The disclosed and other solutions, examples, embodiments, and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Only a few implementations and examples are described, and other implementations, enhancements and variations can be made based on what is described and illustrated in this patent document.

What is claimed is:

1. A method of cleaning a camera, comprising:
   determining, by a processor, an occurrence of a condition to clean a first camera affixed to an autonomous vehicle;
   actuating, in response to the occurrence of the condition, a camera cleaning system to start a camera cleaning operation on the first camera; and
   determining, at a time after the actuating, in response to occurrence of an end condition, to end the camera cleaning operation on the first camera,
   wherein the camera cleaning operation is performed according to a first set of operations where the camera cleaning operation is repetitively performed at a first frequency,
   wherein the camera cleaning operation is performed according to a second set of operations that is performed between two adjacent times when the camera cleaning operation is performed for the first set of operations,
   wherein, in the second set of operations, the camera cleaning operation is repetitively performed at a second frequency higher than the first frequency,
   wherein the camera cleaning operation is performed according to the second set of operations in response to determining that an environmental condition indicates that the camera cleaning operation be performed more often or faster,
   wherein the camera cleaning operation is performed using a first cleaning assembly on the first camera in a direction that is opposite to that of another camera cleaning operation performed using a second cleaning assembly on a second camera located adjacent to the first camera,
   wherein the first cleaning assembly and the second cleaning assembly have components that partially overlap in a first direction and that are offset in a second direction perpendicular to the first direction, and
   wherein the first cleaning assembly and the second cleaning assembly simultaneously and respectively perform the camera cleaning operation and the another camera cleaning operation.

2. The method of claim 1, wherein the actuating the camera cleaning system includes:
   actuating a wiper system to cause a wiper to wipe a surface of the first camera; and
   actuating a fluid pump to cause a cleaning fluid to be sprayed on the surface of the first camera during the camera cleaning operation.

3. The method of claim 2, wherein the actuating the wiper system includes:
   causing an air valve to open to allow air under pressure from an air tank travel through an air cylinder towards the surface of the first camera.

4. The method of claim 2, wherein the actuating the fluid pump includes:
   controlling the fluid pump to pump the cleaning fluid from a fluid storage tank; and
   controlling a liquid valve to cause the cleaning fluid to undergo pressurization such that the cleaning fluid is sprayed on the surface of the first camera.

5. The method of claim 1, wherein the determining the occurrence of the condition includes determining that an amount of time has elapsed since a previous camera cleaning operation.

6. The method of claim 1, wherein the determining the occurrence of the condition includes receiving a message from a controller of the autonomous vehicle that the first camera needs to be cleaned.

7. The method of claim 6, wherein the message from the controller of the autonomous vehicle is generated due to sensing a degradation in a quality of images captured from the first camera.

* * * * *